United States Patent [19]
Lee

[11] Patent Number: 5,917,892
[45] Date of Patent: Jun. 29, 1999

[54] RECORDED TELEPHONE MESSAGE/ NUMBER IDENTIFYING METHOD AND APPARATUS USING TELEVISION SET

[75] Inventor: Jae-Kyung Lee, Daeku, Rep. of Korea

[73] Assignee: LG Electronics Inc., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,992

[22] Filed: Dec. 5, 1996

[30] Foreign Application Priority Data

Dec. 5, 1995 [KR] Rep. of Korea .................... 95/46677

[51] Int. Cl.$^6$ .................................................. H04M 1/64
[52] U.S. Cl. ................................. 379/88.12; 379/88.21; 379/110.01
[58] Field of Search ........................ 379/88, 67, 93.23, 379/110.01, 93.24, 127, 142, 67.1, 88.12, 88.2, 88.21

[56] References Cited

U.S. PATENT DOCUMENTS

| | | | |
|---|---|---|---|
| 4,356,509 | 10/1982 | Skerlos et al. | 379/110.01 X |
| 4,377,729 | 3/1983 | Stacy | 379/110.01 X |
| 4,427,847 | 1/1984 | Hofmann et al. | 379/110.01 X |
| 5,390,236 | 2/1995 | Klausner et al. | 379/67 |
| 5,404,393 | 4/1995 | Remillard | 379/93.19 X |
| 5,550,649 | 8/1996 | Wong et al. | 379/88 X |
| 5,561,709 | 10/1996 | Remillard | 379/93.19 X |
| 5,566,231 | 10/1996 | Sizer, II | 379/142 |
| 5,566,232 | 10/1996 | Sizer, II | 379/142 |
| 5,631,745 | 5/1997 | Wong et al. | 379/88 X |

FOREIGN PATENT DOCUMENTS

| | | | |
|---|---|---|---|
| 57-55654 | 4/1982 | Japan | 379/209 |
| 57-143972 | 9/1982 | Japan | 379/84 |

*Primary Examiner*—Fan S. Tsang
*Attorney, Agent, or Firm*—Ostrolenk, Faber, Gerb & Soffen, LLP

[57] ABSTRACT

A recorded telephone message/number identifying apparatus and method using a television set for displaying in sequential time order on the TV screen phone messages recorded during a recipient's absence so that a message selected from the TV screen can be sounded through a TV speaker. The method comprises storing a guide message in a memory unit, transmitting the guide message to a caller and storing a telephone message recorded by the caller, and displaying a plurality of recorded messages on a TV screen when a message confirming key is input and outputting a voice message of a selected caller when a message voicing key is input.

6 Claims, 7 Drawing Sheets

GUIDE MESSAGE INPUT OPERATION

AUTOMATIC ANSWERING MODE SETTING OPERATION

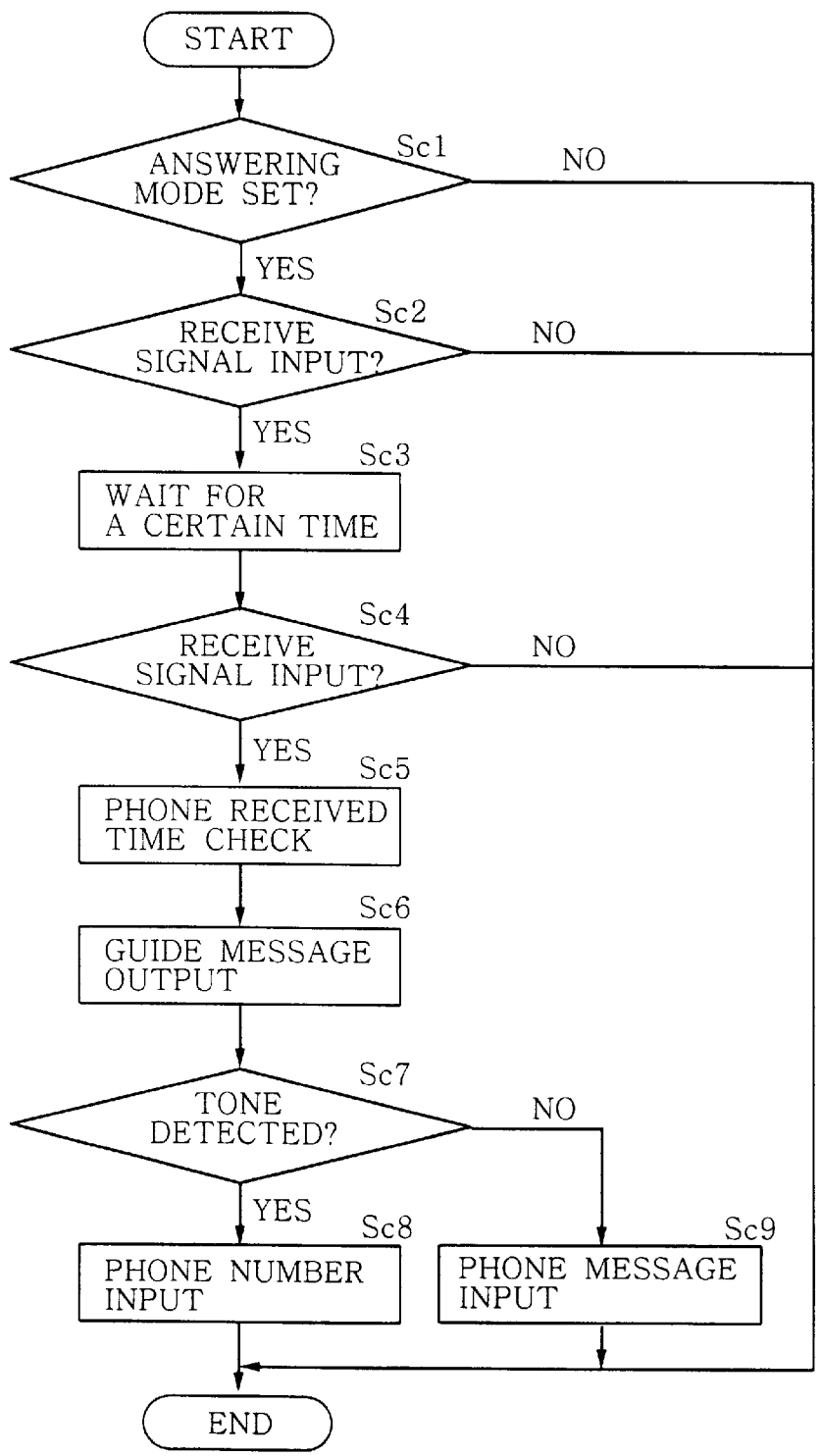

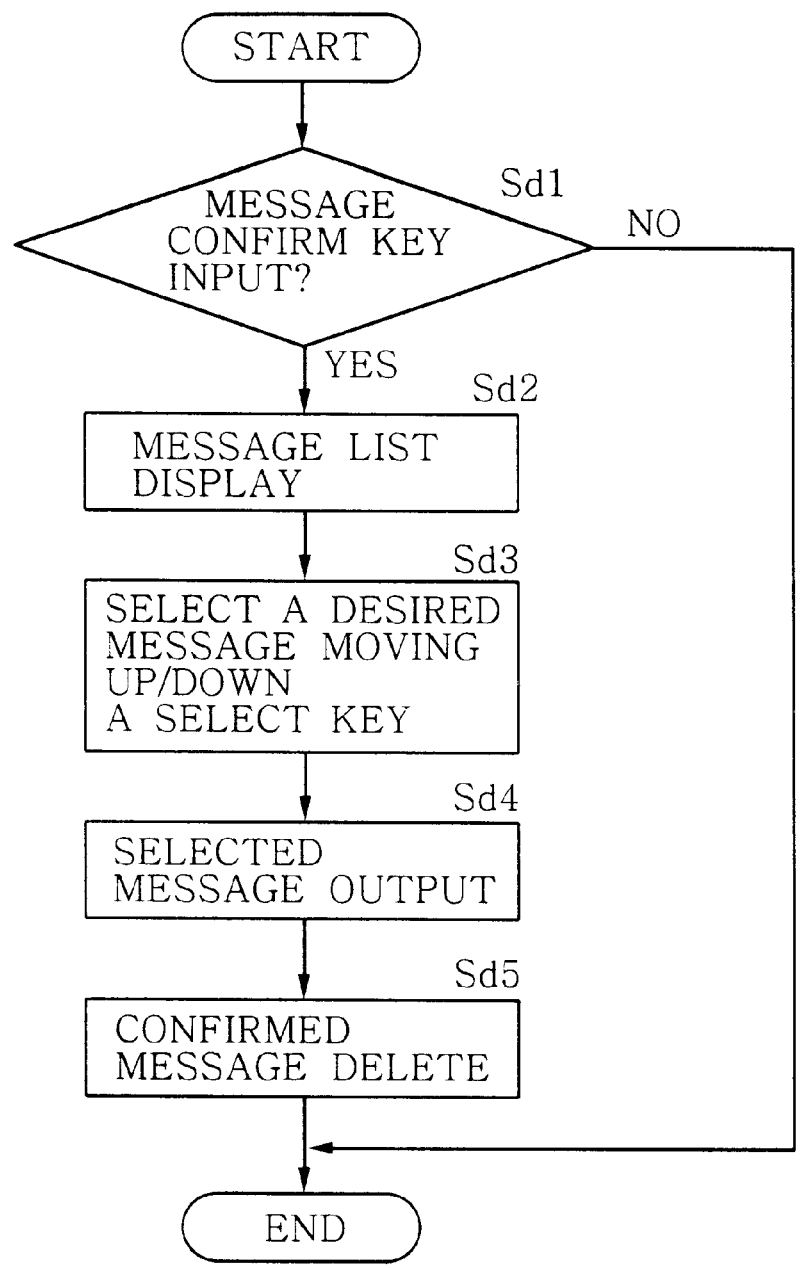

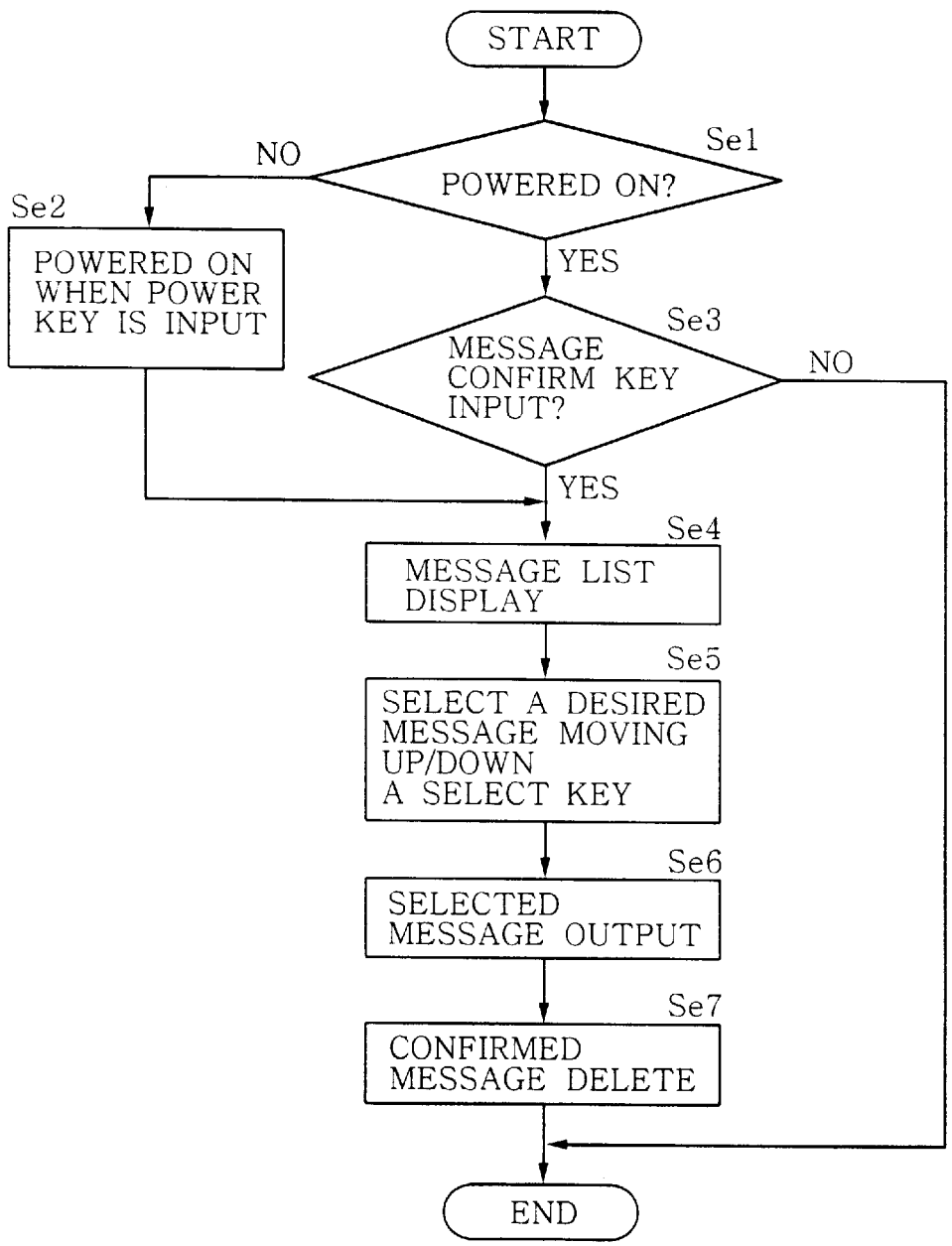

AUTOMATIC ANSWERING MODE DISPLAY

RECEIVED MESSAGE CONFIRM DISPLAY

RECORDED TELEPHONE MESSAGE/ NUMBER IDENTIFYING METHOD AND APPARATUS USING TELEVISION SET

BACKGROUND OF THE INVENTION

1. Field of the Invention

The present invention relates to a telephone message confirming apparatus, and more particularly to a recorded telephone message/number identifying method and apparatus using a television set for displaying in sequential time order on the TV screen phone messages recorded during a recipient's absence, thereby enabling a visual confirmation of the recorded messages.

2. Description of the Prior Art

In an answering machine applied to a conventional telephone, when a phone call is received during a recipient's absence, a guide or greeting message recorded previously by the recipient is initially transmitted to the calling party and then a message from the calling party is recorded.

As shown in FIG. 1, a conventional signal processor in a television set includes: a tuner 1 for tuning a high frequency signal output from an antenna ANT; an infrared receiver 11 for receiving a signal from a remote controller 10; a microcomputer 9 for controlling the television set according to data received via the remote controller 10 or input via a key matrix 12; an intermediate frequency detector 2 for separating an intermediate frequency signal output from the tuner 1 into a voice signal and a picture signal; a voice signal amplifier 3 and a voice signal output circuit 4 for each amplifying the voice signal from the intermediate frequency detector 2 and outputting the resultant signal; a speaker 5 for outputting as sound the voice signal from the voice signal output circuit 4; a picture signal processor 6 for selecting and processing a TV image signal and red, green and blue color signals from an on-screen display circuit; a picture signal output circuit 7 for outputting the picture data processed in the image signal processor 6; and a picture tube 8 for displaying on the TV screen the picture signal outputted from the picture signal output circuit 7.

According to the thusly composed conventional signal processing apparatus in a TV set, the key input signal from the key matrix 12 is applied to the microcomputer 9 which in turn decodes a corresponding key signal to thereby carry out a desired function. At this time, if the input key signal is related to a channel, channel data is output to the tuner 1 to thereby select a corresponding frequency and the selected intermediate frequency signal IF is applied to the intermediate frequency detector 2.

Meanwhile, the intermediate frequency detector 2 separates a voice signal and a picture signal from each other thus to be applied to the voice signal amplifier 3 and the image signal processor 6, respectively, whereby the corresponding channel signal is reproduced into a picture and sound.

At this time, the microcomputer 9 outputs the R,G,B color signals to the picture signal processor 6 thus to carry out an on-screen display (OSD), and the picture signal processor 6 combines a chroma signal of the TV set with the R,G,B color signals of the OSD and the resultant image signal is output to the picture tube 8, whereby the OSD and the picture signal are simultaneously displayed on the TV screen. Here, such functions can be controlled using the remote controller 10 or the key matrix 12.

However, the TV set according to the prior art does not have a automatic answering function for telephone calls. Besides, in presently available telephone answering machines, messages recorded on the answering machine cannot be visually identified and must be sequentially reproduced one at a time.

Further, present telephone answering machines often lack a clock function so that it has been difficult to know when the messages were recorded.

SUMMARY OF THE INVENTION

Accordingly, it is an object of the present invention to provide a recorded telephone message/number identifying method and apparatus using a television set for displaying in sequential time order on the TV screen phone messages recorded during a recipient's absence so that a message may be selected from the TV screen and played back through the TV speaker.

To achieve the above-described object, the recorded telephone message/number identifying apparatus using a television set having a tuner for tuning a high frequency signal output from an antenna and converting it to an intermediate frequency signal and an intermediate frequency detector for processing the intermediate frequency signal output from the tuner includes: a voice signal amplifier for amplifying the output from the intermediate detector; an encoder for encoding a voice signal from a microphone for recording a guide message; a memory unit for storing the voice signal encoded by the encoder; a phone line interface for processing the voice signal stored in the memory unit; a decoder for decoding and outputting the voice signal stored in the memory unit; a switch for selecting between the voice signal amplified by the voice signal amplifier and the voice signal output from the decoder; a voice signal output circuit for outputting the selected voice signal; a speaker for sounding the outputted selected voice signal; and a microcomputer for controlling operation of the tune, memory unit and switch.

Further, the recorded telephone message/number identifying method using a television set includes: storing a guide message in a memory unit; transmitting to a caller the guide message when a telephone call receiving signal is input, and storing a telephone message recorded by the caller; and displaying a list of recorded messages on a TV screen when a message confirming key is input, and outputting a voice message of a selected caller when a message voicing key is input.

BRIEF DESCRIPTION OF THE DRAWINGS

FIG. 3C is a flow chart showing an automatic answering process according to the present invention;

FIG. 3D is a flow chart of a procedure for identifying a recorded message according to the present invention;

FIG. 3E is a flow chart of a procedure for identifying another message in the process FIG. 3D;

DETAILED DESCRIPTION OF THE PRESENT INVENTION

Figure 1:
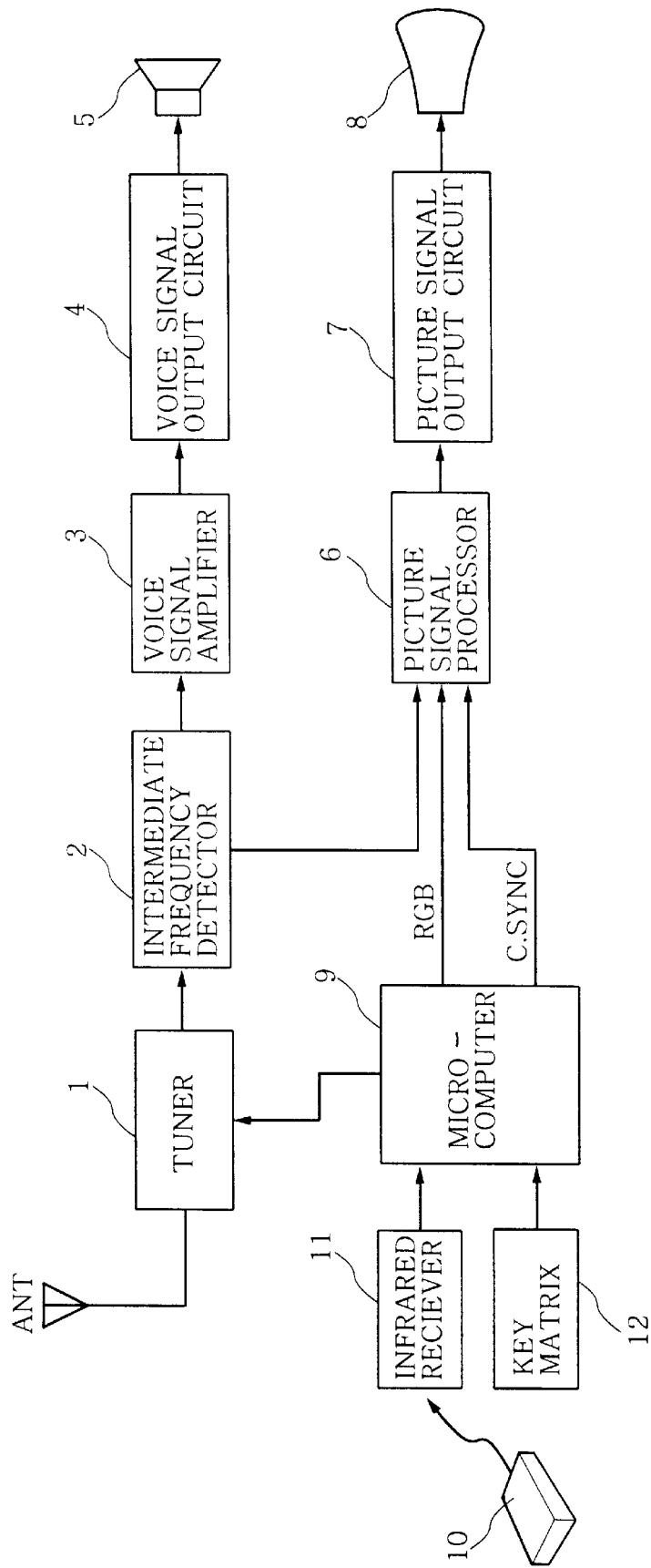
FIG. 1 is a schematic block diagram showing signal processing stages in a conventional TV set.
Figure 2:
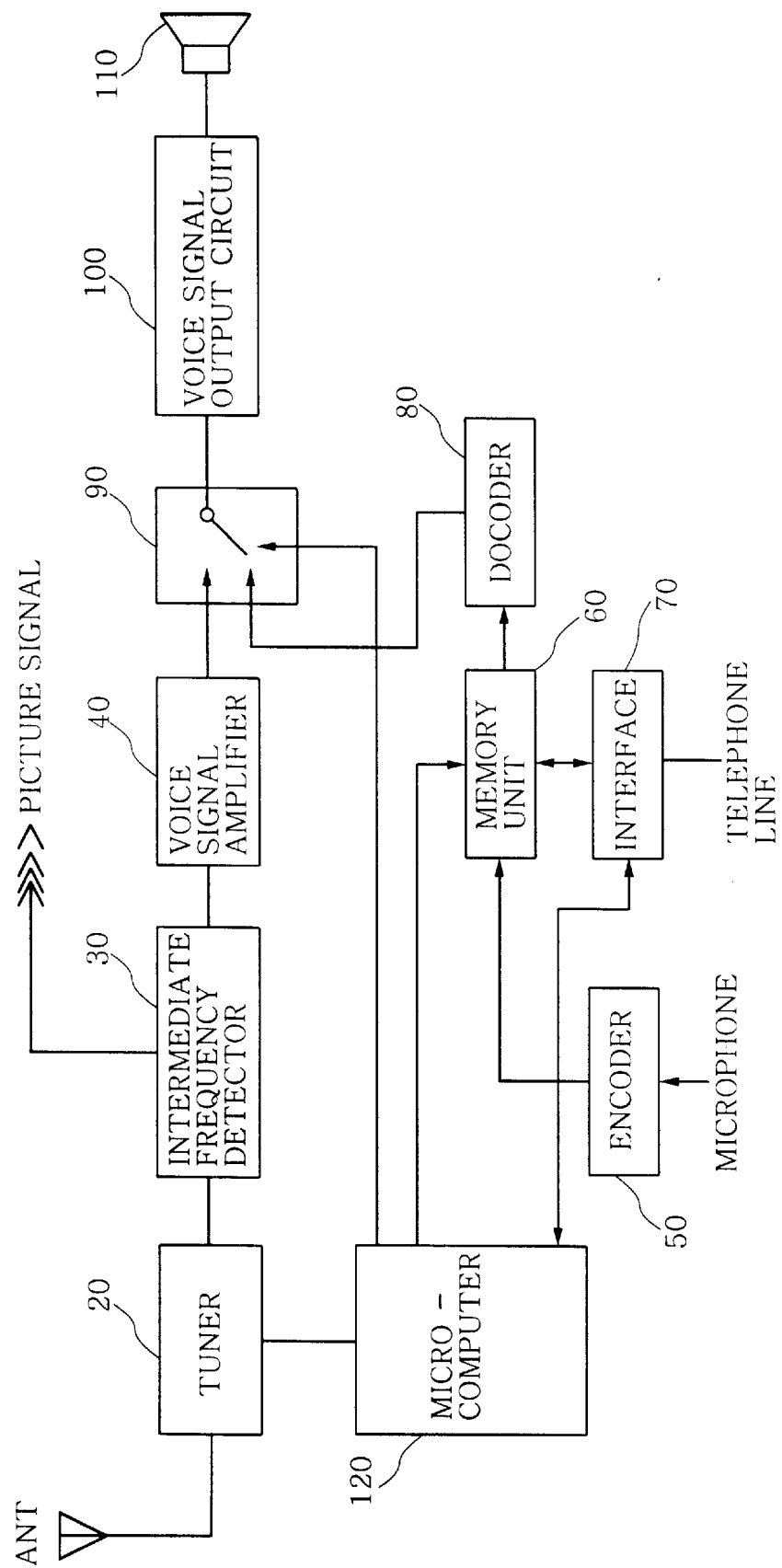
FIG. 2 is a schematic block diagram showing a television signal processor provided with an automatic telephone answering machine function according to the present invention.

As shown in FIG. 2, the recorded telephone message/number identifying apparatus according to the present invention uses a television set which includes a tuner 20 for tuning a high frequency signal received via an antenna ANT and converting it to an intermediate frequency signal; an intermediate frequency detector 30 for processing an intermediate frequency signal output from the tuner 20; a voice signal amplifier 40 for amplifying the output from the intermediate frequency detector 30; an encoder 50 for encoding a voice signal output from a microphone by which a guide message is recorded; a memory unit 60 for storing the voice signal encoded in the encoder 50; a phone line interface 70 to which the telephone line is connected for processing a voice signal stored in the memory unit 60; a decoder 80 for decoding and outputting the voice signal stored in the memory unit 60 to a speaker; a switch 90 for selecting between the TV voice signal amplified by the voice signal amplifier 40 and the voice signal output from the decoder 80; a voice signal output circuit 100 for outputting the selected voice signal; a speaker 110 for sounding the recorded message; and the microcomputer 120 for controlling general operations of the associate elements.

With reference to the accompanying flow charts, the operation of the present invention will now be described.

Figure 3A:
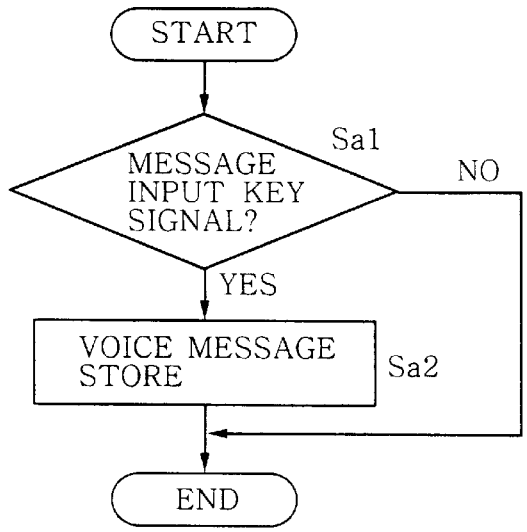
FIG. 3A is a flow chart of a guide message input procedure according to the present invention.

As shown in FIG. 3A, an input method of the guide message includes a first step Sa1 wherein, when a phone line is connected to the interface 70, it is judged whether a guide message storing key signal is received, and a second step Sa2 wherein if the guide message storing key signal is input, a voice message is encoded into a voice signal in accordance with the control of the microcomputer 120 and stored in the memory unit 60, whereby if a message storing key signal is not input the guide message storing steps are not performed.

Figure 3B:
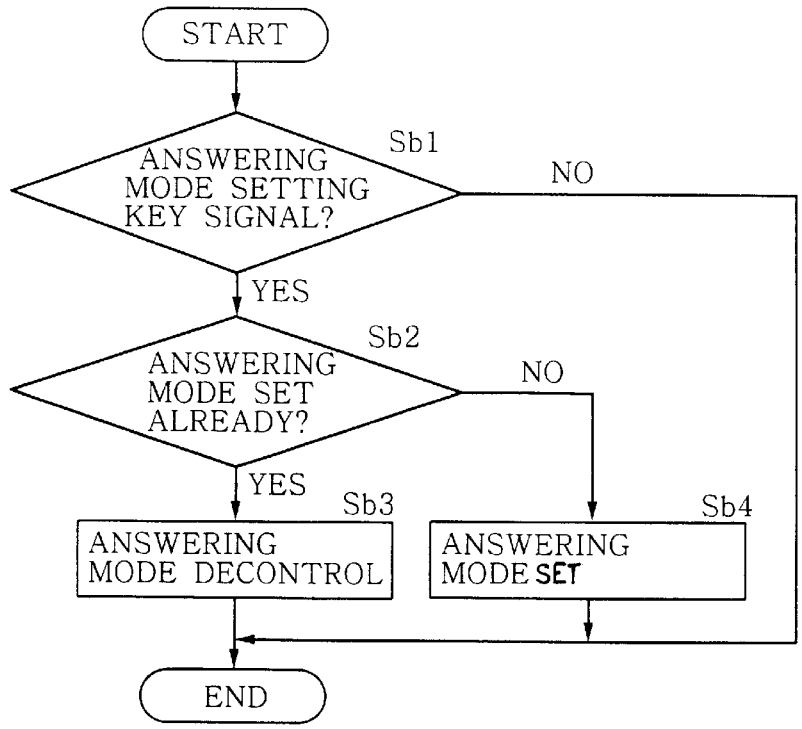
FIG. 3B is a flow chart of a procedure for setting an automatic answering mode according to the present invention.

An automatic answering mode setting method as shown in FIG. 3B includes: a first step Sb1 for judging whether an automatic answering mode setting key signal is input; a second step Sb2 for judging in the microcomputer 120 whether an automatic answering mode is preset; a third step Sb3 for disregarding an automatic answering mode setting key signal if there is already an automatic answering mode; and a fourth step Sb4 for setting the automatic answering mode if not set in the second step Sb2.

As shown in FIG. 3C, the operation of the thusly set automatic answering mode comprises: a first step Sc1 for judging whether the automatic answering mode is set; a second step Sc2 for terminating the operation if an automatic answering mode is judged not set in the first step Sc1, or judging in the microcomputer 120 whether a call receiving signal is input when an automatic answering mode is set; a third step Sc3 for terminating the operation if there is not input a call receiving signal, or waiting for a certain time if there is input a call receiving signal; a fourth step Sc4 for judging after waiting for a certain time whether there is input a call receiving signal; a fourth signal Sc5 for terminating the operation if there is not input a call receiving signal, or checking the received time if there is input a phone call receiving signal; a sixth step Sc6 for transmitting the guide message to a calling party; a seventh step Sc7 for judging whether a receiving phone number tone signal is detected; an eighth step Sc8 for storing the phone number tone signal transmitted from the calling party if a receiving phone number tone signal is detected; and a ninth step Sc9 for storing a voice message from the calling party if a receiving phone number tone signal is not detected.

Referring to FIG. 3D, the operation for identifying a recorded message from the caller comprises: a first step Sd1 for judging whether a message confirming key is input by the user; a second step Sd2 for terminating the operation if the message confirming key is not input, or displaying on the TV screen the stored message list in sequential time order; a third step Sd3 for selecting a desired message from the displayed list; a fourth step Sd4 for playing a voice message from a caller selected from the list; and a fifth step Sd5 for deleting a confirmed message.

As shown in FIG. 3E, the operation for identifying another phone message comprises: a first step Se1 for judging whether the TV set is powered on; a third step Se3 for judging whether a recorded message confirming key is input when the TV set is powered on in the first step Se1; a second step Se2 for inputting a power-on key if the TV set is not powered on wherein the message confirming key is automatically input in accordance with the input power key; a fourth step Se4 for terminating the operation if the message confirming key is not input, or displaying on the TV screen the stored message list in sequential time order; a fifth step Se3 for selecting a desired message from the displayed list; a sixth step Se4 for playing a voice message from a caller selected from the list; and a seventh step Se5 for deleting a confirmed message.

That is, if a power-on key is input when a TV set is turned off, the recorded phone messages and/or phone numbers are displayed on the TV screen in a sequential time order. When a user selects a recorded message for confirming, the voice message of the corresponding caller is output from the memory unit 60 to the decoder 80 for decoding in accordance with the control of the microcomputer 120, thus to be output via the switch 90 to the speaker 110, whereby the user can confirm the message and the confirmed message can then be deleted from the memory unit 60.

Also, in the above process, if the user wishes to phone to the caller back after confirming the message recorded by the caller, a phonecall can be automatically made to the caller via the interface 70 in accordance with the control of the microcomputer 120, by selecting a phone message from the list displayed on the on-screen display and pushing a specific key. When the apparatus according to the invention is employed by a plurality of users or as a private voice box, a secret number can be assigned to each of the users so that a message can be only delivered to a corresponding user.

Figure 4A:
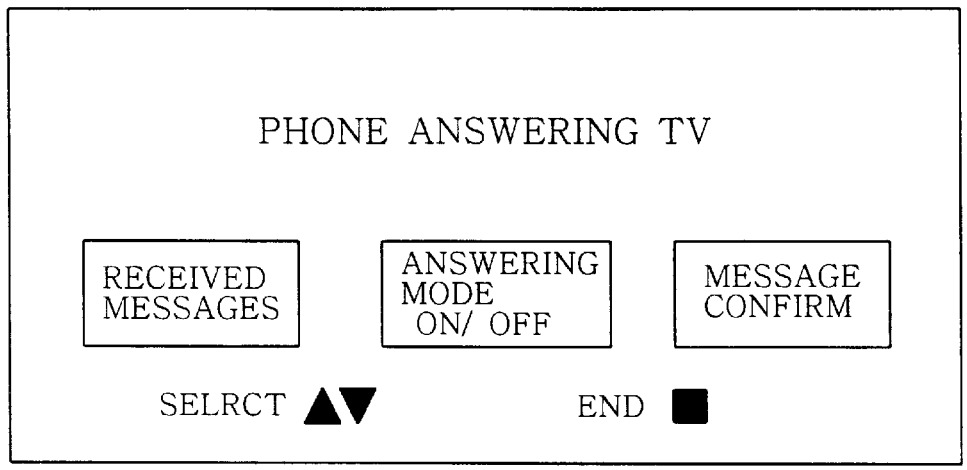
FIG. 4A is a view showing a TV screen display during an automatic answering mode according to the present invention.

When an automatic answering mode is set in FIG. 3B, the mode display is as shown in FIG. 4A. Here, the user can select from the contents menu/list appearing on the screen using a select key and an end key.

Figure 4B:
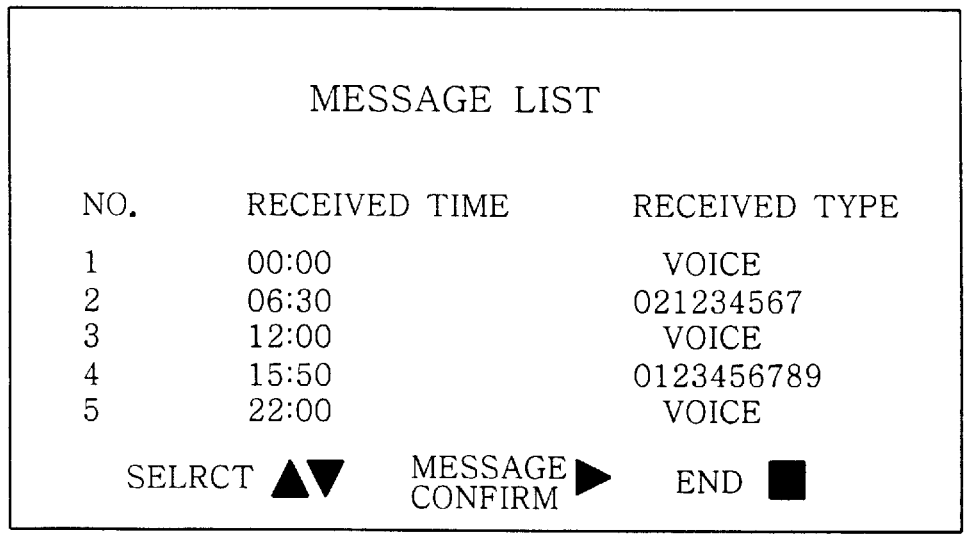
FIG. 4B is a view showing a TV screen display during a message identifying mode according to the present invention.

The list of the recorded messages is shown on the screen as shown in FIG. 4B, and the user can select a desired message using the select key and also the contents of the message can be played using a confirm key.

As described above, the present invention displays on a TV screen a list of the telephone messages recorded by callers in sequential time order, and when a phone number is selected for a preferential confirmation by a user the selected message is played back through the speaker of the TV set, and also when a specific key is selected after the selection of the phone number of the caller the phone is automatically connected to the caller, thereby increasing the convenience in a telephone communication. Further, a secret number can be assigned to each of a plurality of users so that a private voice box user can be employed accordingly.

What is claimed is:

1. A recorded telephone message/number identifying apparatus using a television set having a tuner for tuning a high frequency signal output from an antenna and converting it to an intermediate frequency signal and an intermediate frequency detector for processing the intermediate frequency signal output from the tuner, comprising:

a voice signal amplifier for amplifying the output from the intermediate frequency detector;

an encoder for encoding a voice signal from a microphone for recording a guide message;

a memory unit for storing the voice signal encoded by the encoder;

a phone line interface for processing the voice signal stored in the memory unit;

a decoder for decoding and outputting the voice signal stored in the memory unit;

a switch for selecting between the voice signal amplified by the voice signal amplifier and the voice signal output from the decoder;

a voice signal output circuit for outputting the selected voice signal;

a speaker for sounding the outputted selected voice signal; and a microcomputer for controlling operation of the tuner, memory unit and switch.

2. A recorded telephone message/number identifying method using a television set, comprising:

providing an automatic answering facility in the television set;

storing a guide message in a memory unit when an automatic answering message input key is noted;

judging whether an automatic telephone answering mode has been set when an automatic telephone answering mode setting key is operated, and accordingly setting or deleting an automatic telephone answering function;

switching between providing a telephone answering service by judging whether a telephone call receiving signal is input during an automatic telephone answering mode, and performing a general TV function when the automatic telephone answering mode is off;

transmitting to a caller the guide message when a telephone call receiving signal is input, and storing a telephone message recorded by the caller; and selectively displaying a list of recorded messages on a TV screen when a message confirming key is operated, and selectively outputting a voice message of a selected caller when a message voicing key is operated.

3. The method of claim 2, further comprising deleting the voice message after outputting it.

4. The method of claim 2, further comprising automatically connecting to the caller by telephone when a specific key is operated in a message confirming mode after outputting the voice message of the caller.

5. The method of claim 2, wherein a private secret number is given to each of a plurality of users applicable to a private voice box.

6. The method of claim 2, wherein the step of displaying the list of recorded messages is automatically performed when the TV set is powered on.

\* \* \* \* \*